United States Patent Office 3,553,987
Patented Jan. 12, 1971

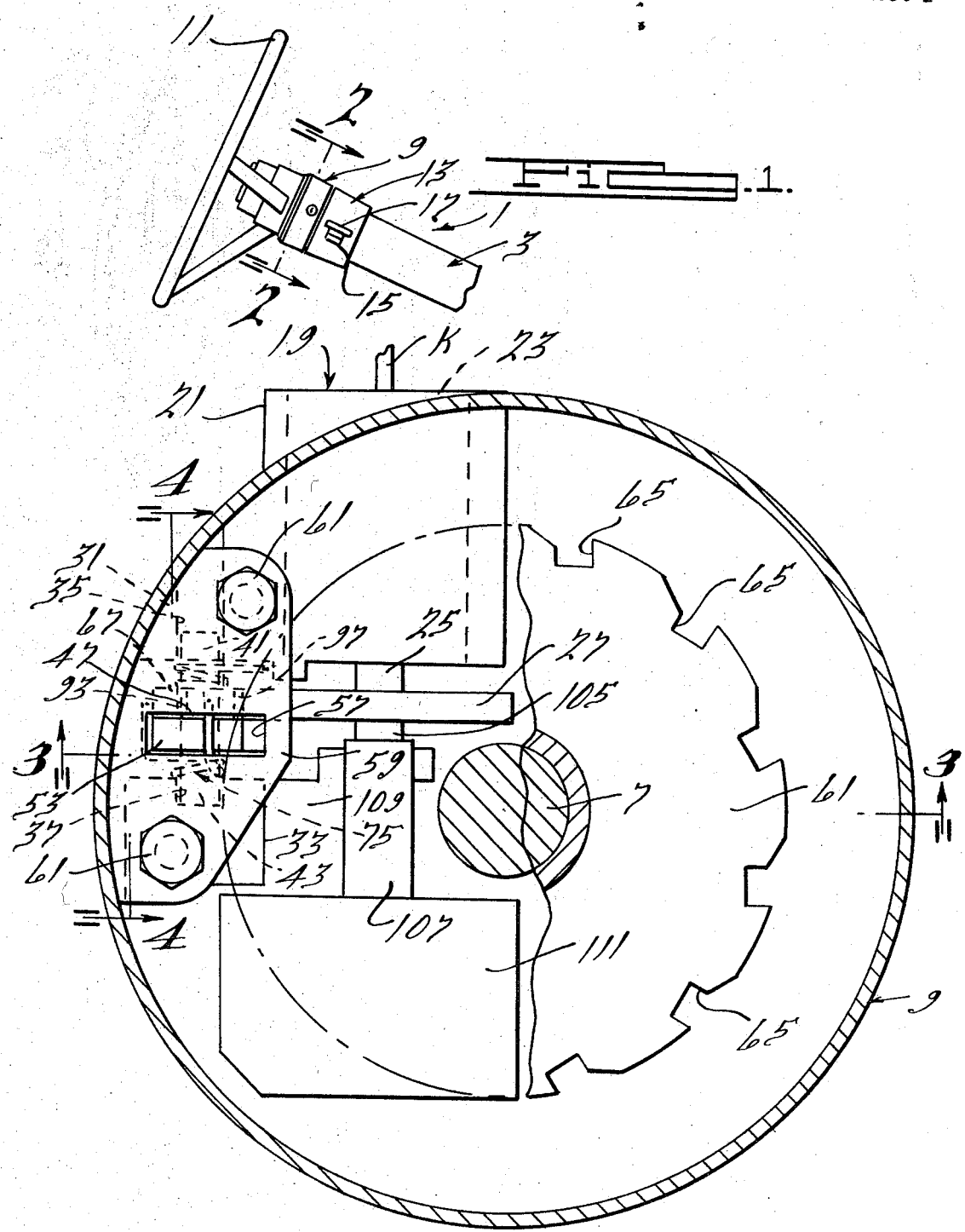

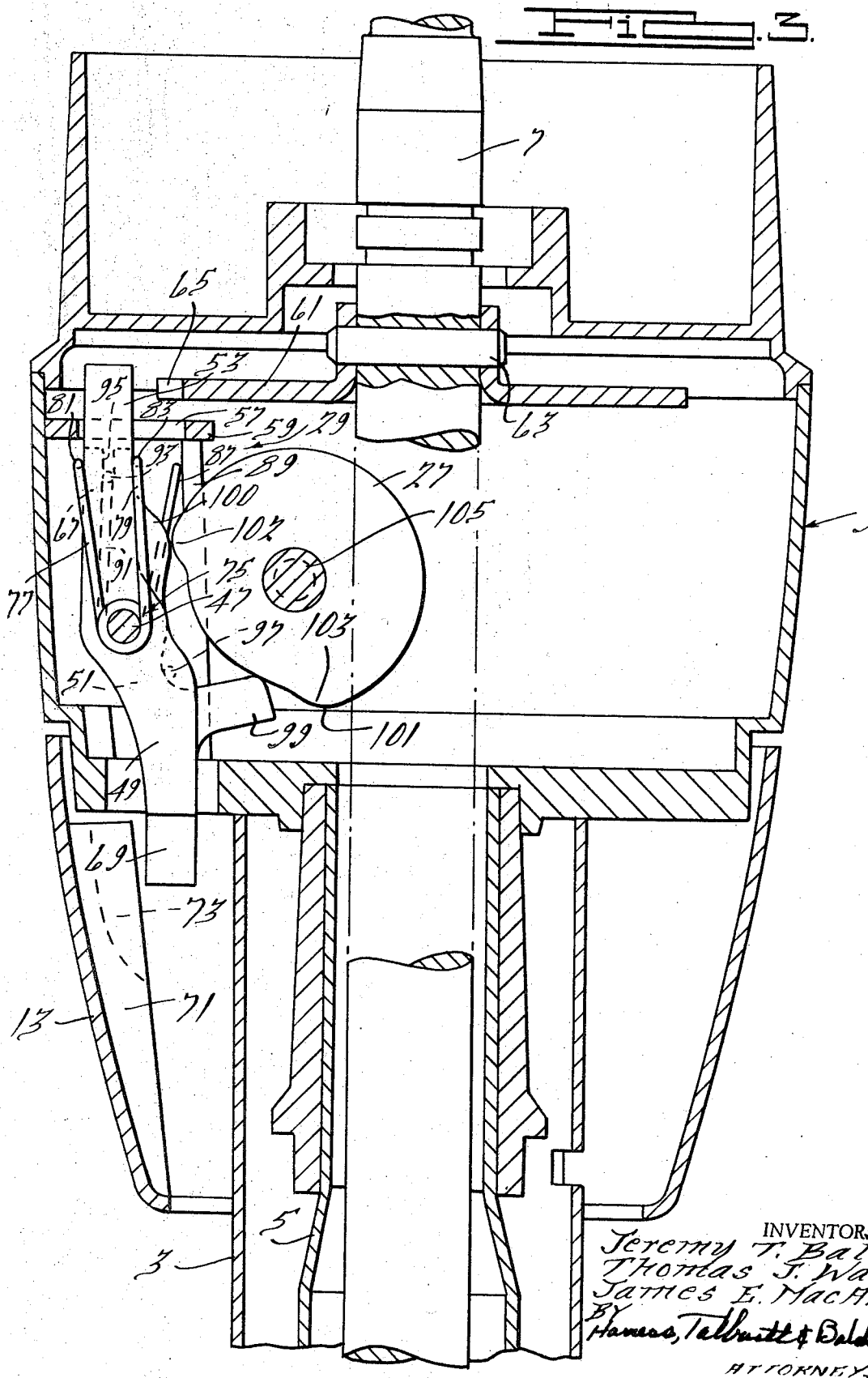

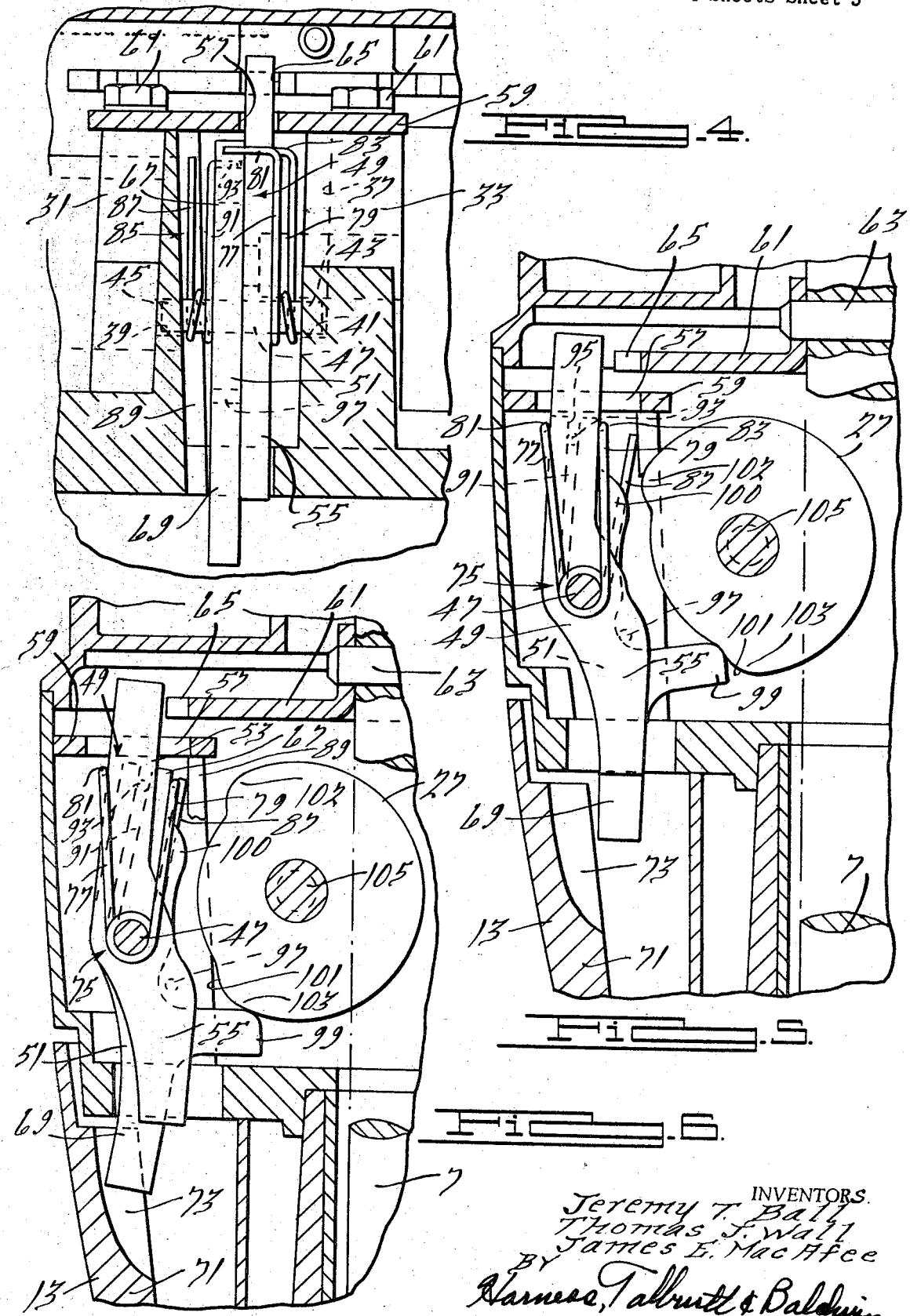

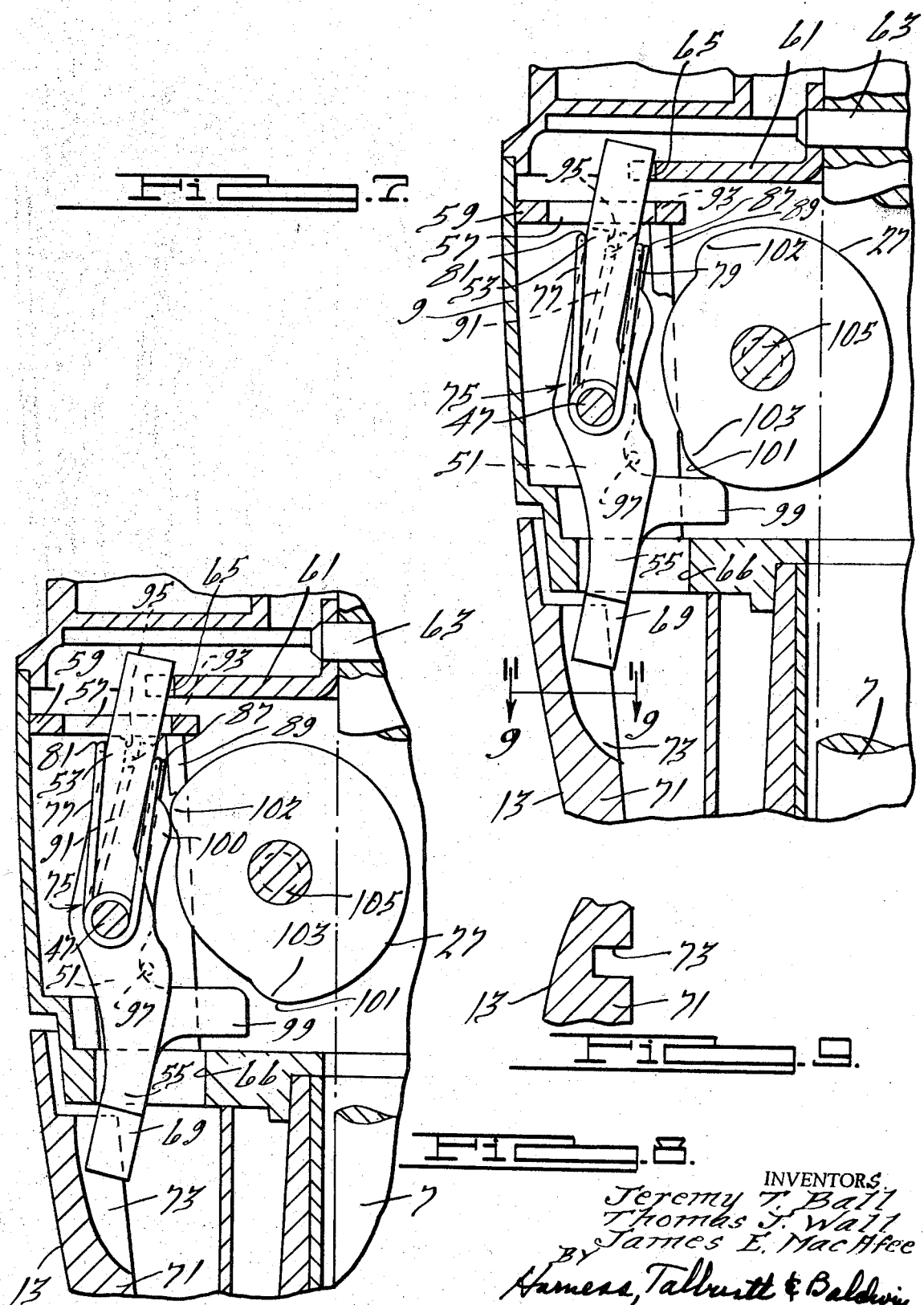

3,553,987
STEERING COLUMN AND TRANSMISSION CONTROL LOCK
Jeremy T. Ball, Birmingham, Thomas J. Wall, Southfield, and James E. MacAfee, Troy, Mich., assignors to Chrysler Corporation, Highland Park, Mich., a corporation of Delaware
Filed Aug. 21, 1968, Ser. No. 754,422
Int. Cl. E05b 65/12
U.S. Cl. 70—252                          11 Claims

ABSTRACT OF THE DISCLOSURE

Improved steering, transmission and ignition lock apparatus for an automotive vehicle steering column including two locking pivotable members and keeper members located, respectively, on the steering shaft and the shift tube. A single control mechanism operates the movements of both members as well as an ignition switch. The three locking components are all located within a housing on the steering column.

BACKGROUND OF THE INVENTION

This invention relates to automotive vehicle locking systems, and more particularly to improved steering, transmission and ignition lock apparatus for automotive vehicles and is an improvement of the apparatus disclosed in U.S. patent applications Ser. Nos. 729,965 and 754,421 filed May 17, 1968 and Aug. 21, 1968, respectively.

This invention is an improvement in locking arrangements of the type which are adapted to lock a vehicle steering component, and a transmission selecting component for manually selecting the various transmission operating ranges of the vehicle transmission, both of the components forming part of an automotive steering column assembly. This invention also provides a locking means for the vehicle ignition system.

SUMMARY OF THE INVENTION

Briefly, this invention comprises a locking apparatus for an automotive vehicle including means for locking a steering shaft, means for locking a transmission selector tube and means for disabling the ignition circuit of the vehicle.

One of the primary objects of this invention is to provide an improved automotive vehicle locking system for locking the transmission, steering and ignition components of the vehicle in which access to and tampering with any of the components are rendered extremely difficult.

Another object of this invention is to provide an improved locking system of the class described which is compact and substantially simultaneously operative to lock the respective components with which they are associated.

A further object of this invention is to provide a locking apparatus, of the type described in which the locking components are urged toward locking position by a single manual movement of a control member, such as a key.

Still another object of this invention is to provide locking apparatus, such as described, wherein the control member cannot be moved to a locking position until the transmission range selector is located in a predetermined position.

Another object of this invention is to provide apparatus such as described which will not permit locking of the steering shaft if installed improperly, thereby preventing the possibility of a sudden locking of the steering shaft while the vehicle is in motion.

A further object of this invention is to provide apparatus of the class described wherein the steering shaft lock and the transmission lock are positively driven from a locked position when the ignition key is turned from a Lock position to an Off position.

A further object of this invention is to proivde a locking system, such as described, which is economical in construction and effective in operation.

Other objects and advantages of this invention will be made apparent as the description progresses.

BRIEF DESCRIPTION OF THE DRAWINGS

In the accompanying drawings, in which one of various embodiments is illustrated, FIG. 1 is a fragmentary plan view of an automotive vehicle steering column construction including the steering, transmission and ignition locking apparatus of this invention;

FIG. 2 is an enlarged section taken generally along lines 2—2 of FIG. 1;

FIG. 3 is a section taken generally along lines 3—3 of FIG. 2;

FIG. 4 is a section taken generally along lines 4—4 of FIG. 2;

FIGS. 5–8 are fragmentary views of FIG. 2 showing certain parts in moved positions; and FIG. 9 is a section taken generally along lines 9—9 of FIG. 7.

DESCRIPTION OF THE PREFERRED EMBODIMENT

Referring now to the drawings, a steering column assembly for an automotive vehicle is generally indicated at 1 in FIG. 1. As will be understood, the assembly 1 is mounted in the passenger compartment and extends through a firewall (not shown) to the engine compartment. The steering column assembly is connected to the vehicle body and firewall by conventional mounting structure (not shown) and basically includes a supporting outer tubular column 3 within which a transmission range selector tube 5 and a steering shaft 7 are rotatably mounted.

The column 3 is provided at its upper end with a stationary and preferably cast housing 9 which contains the locking apparatus of this invention. Housing 9 serves as a mounting for the upper end portion of the steering shaft 7 which is rigidly secured by conventional means (not shown) to the hub of the vehicle steering wheel 11. A transmission selector or shift bowl 13 is rotatably mounted by conventional mounting structure (not shown) immediately below housing 9. Bowl 13 has a mounting portion 15 to which the usual shift lever 17 is connected.

Conventional shift tube 5 extends downwardly through the support tube 3 and is adapted to be rotated by conventional means (not shown) upon rotational movement of shift lever 17. Steering shaft 7 extends through shift tube 5 to a steering mechanism in the engine compartment.

Referring now more specifically to the locking apparatus of this invention, the same includes a conventional cylinder lock actuator 19 mounted within a boss 21 on housing 9. Cylinder lock actuator 19 includes an inner core 23 and has a conventional tumbler construction and home position locking mechanism which, upon the insertion of a properly coded key K, permits the key to rotate the core 23, but which prevents the withdrawal of the key unless the latter is in a "home" position.

A splined or similar rotatable drive connection 25 is provided between the inner end of core 23 and an actuating cam plate or member 27. Plate 27 is adapted to be rotated through a predetermined angle upon rotation of key K.

The actuating cam plate 27 is adapted to actuate a steering shaft and shift selector locking mechanism now to be described. Housing 9 includes a locking mechanism housing 29 having two generally axially extending portions 31 and 33 separated from one another to provide a mechanism receiving space 34. The portions 31 and 33 have axially extending slots 35 and 37, respectively, on the bottoms 39 and 41 of which the opposite ends 43 and 45 of a pin or shaft 47 are seated.

Shaft 47 supports two locking levers or members 49 and 51 for rotary or pivotal movement about the axis of the shaft. Locking lever 49 may be referred to as the steering shaft locking lever, while locking lever 51 may be referred to as the transmission selector locking lever. Steering shaft locking lever 49 includes upper and lower arms 53 and 55. The upper arm 53 extends upwardly through a slot 57 in a cover plate 59 secured by fasteners 61, to the generally axially extending portions 31 and 33 of housing 29. The upper arm extends above cover plate 59 to a point located above the plane in which an annular keeper plate 61 is located. Keeper plate 61 is secured to shaft 7 as indicated at 63 and has a plurality of locking lever receiving notches or recesses 65 formed in its outer periphery in an equally spaced relationship. The notches 65 are adapted to be aligned with the upper portion of arm 53 for receiving the latter when lever 49 is swung clockwise from its FIG. 3 position, as described hereinafter in a plane extending generally normal to a plane passing through the axis of the shaft 7, to its FIG. 8 position. It will be seen that when the upper end of lever 49 is located in one of the notches 65, the steering shaft 7 is locked against substantial rotary movement. The lower arm 55 extends downwardly into an opening 66 in a lower wall of housing 9.

Transmission selector locking lever 51 includes upper and lower arms 67 and 69. The lower arm 69 extends downwardly through opening 66 to a point adjacent a built-up or thickened guard wall portion 71 of shift bowl 13. Wall portion 71 has a notch or slot 73 therein which is adapted to be located in the path of movement of lever 51 when the shift bowl is in a predetermined position, such as when the shift bowl is in a position corresponding to a "Park" position in an automatic transmission or the "Reverse" position, for example, of a manual transmission. It will be seen that when the lower end of lever 51 is moved in a plane extending generally normal to a plane passing through the axis of shaft 7, into slot 73, the shift bowl, and accordingly, the transmission, will be locked in such position.

Levers 49 and 51 are resiliently coupled together for unitary movement by a spring 75 which extends around shaft 47. Spring 75 has two upwardly extending legs 77 and 79 which are located between lever 49 and housing portion 33 and have two feet or projections 81 and 83 extending across the thicknesses of the upper arm 53 of lever 49 and the upper arm 67 of lever 51. The spring 75 thus exerts a biasing force on the levers which tends to hold them together for unitary movement toward a locking position.

A second spring 85 extends around shaft 49 between lever 51 and housing portion 31. Spring 85 includes a first upwardly extending leg 87 which engages a shoulder 89 formed adjacent housing portion 31. A second upwardly extending leg 91 has an internal foot or projection 93 extending into a slot 95 formed in the upper end of lever 51. Spring 85 exerts a bias on the lever 51 which tends to move the lever 51, and lever 49 due to spring 75 and a pin 97, described hereinafter, toward the position shown in FIG. 3. In this position, both the lever 49 and the lever 51 are in their normal non-locking positions.

As will be made apparent, the pin 97 which extends from the lower arm 55 to lever 49 across and adjacent the lower arm 69 of lever 51 prevents and holds the lever 49 from movement into any of the notches 65 unless the lower end of lever 51 is moved into slot 73. Also, pin 97 causes lever 49 to be moved out of a notch 65 when lever 51 is moved to a nonlocking position.

The lower arm 69 of lever 51 has a finger or follower 99 which extends toward and engages the cam surface 101 of actuating plate 27. As the plate 27 is rotated clockwise as viewed in FIGS. 3 and 5–7, from the FIG. 3 position a lobe 103 forces finger 99 to the left and causes rotation of lever 51 clockwise about the axis of shaft 47. A second follower or protusion 100 is provided on upper arm 67 of lever 51 and extends toward the cam surface 101 of actuating cam plate 27. Plate 27 is provided with a second lobe portion 102 above the axis of rotation of plate 27. Movement of plate 27 from its FIG. 7 position back to the position shown in FIG. 3 causes lobe 103 to move away from finger 99, thus permitting spring 85 to snap the lever assembly back to the FIG. 3 position. However, as explained hereinafter, if friction between the upper end of lever 49 and the side of notch 93 in which the lever 49 is located is such that the force of spring 85 on the lever assembly is insufficient to remove the lever 49 from the notch, lobe 102 pushes against follower 100 and positively drives the lever 51 back to its FIG. 3 position. As the lever 51 moves back to the FIG. 3 position, it engages pin 97 and forces lever 49 to swing counterclockwise as viewed in FIG. 8 back to its FIG. 3 position.

A shaft 105 extends from actuating plate 27 through a bearing or journal 107 mounted on a support 109 to an ignition and starter switch component 111. Component 111 may be of conventional design and similar to the ignition and starter switch presently used on vehicles manufactured by the assignee of this application. Details of such a switch 111 are shown in copending application Ser. No. 729,965. Suffice to state that the switch is adapted to be rotated clockwise from an Accessory position to the sequential positions of Lock, Off, Ignition or Run, and Start to make or break conventional vehicle circuits. Ignition switches of this type are well known and further description thereof is believed unnecessary.

Operation of the apparatus as employed in a vehicle having an automatic transmission is as follows:

It will be assumed that the gear selector lever is in a position other than the Park position, i.e., it is in Reverse, Neutral or one of several Drive positions. The cylinder locking actuator core 23 is in a position other than that position designated Lock, and it will be assumed that it is in the Ignition position. In such position, the actuator plate 27 is in the position shown in FIGS. 3 and 5. In such position, the spring 85 maintains the lever assembly 49, 51 in a nonlocking position shown in FIGS. 3 and 5. Since the slot 73 in wall portion 71 is not aligned with the lower end of lever 51, the wall portion prevents any substantial clockwise movement of lever 51. Accordingly, spring 75 also prevents clockwise movement of lever 49 relative to lever 51 and hence, both the steering shaft 7 and the shift bowl-shift tube assembly 13, 5 are rotatable.

The locking apparatus is operated by turning the key K from the Ignition position first to the Off position. This movement of the key rotates the actuator plate 27 clockwise, as viewed in FIGS. 3 and 5, a small amount, However, the lobe 103 is not yet in engagement with finger 99 and accordingly, the lever assembly 49, 51 does not move. Movement of the key K to the Off position merely causes the switch 111 to move to a position wherein the ignition circuit is interrupted, thereby disabling the engine. When the transmission selector lever is in any position except Park, the notch 73 is not aligned with lever 51. Accordingly, any attempt to turn key K to the Lock position will be prevented by the engagement of the lower end of lever 51 with the wall portion 71 of bowl 13.

The transmission selector lever 17 must next be moved to the Park position to bring slot 73 into alignment with the lower end of lever 51. The key K is then turned to the Lock position. This movement rotates actuator plate 27 to the position shown in FIG. 6. As the actuator plate turns from the FIG. 6 position, the lobe 103 moves follower 99 to the left and causes lever 51 to swing clockwise about the axis of shaft 47, thereby placing the lower end of lever 51 in slot 73. This prevents any substantial rotation of transmission selector bowl 13 and tube 5.

As the actuator plate 27 is moved to the position shown in FIGS. 6 and 7, the pin 97 moves with lever 51, thus freeing lever 49 for clockwise movement. Spring 75 biases lever 49 clockwise since the upper arm 67 of lever 51 is moved clockwise from its FIG. 5 position by the lobe 103. If the keeper plate 61 is in a position wherein one of the notches 65 is aligned with the upper end of lever 49, the upper end of such arm is pushed by spring 75 into such notch as shown in FIG. 7, thereby engaging the keeper plate and preventing substantial rotation of the latter, and hence, substantial rotation of steering shaft 7.

If the keeper plate 61 is in a position wherein one of the notches is not aligned with the upper end of lever 49, the upper end of such lever engages the side of the keeper plate between two notches 65 and is prevented from further clockwise movement as shown in FIG. 6. Movement of lever 51 into its slot 73 cocks or loads the spring 75. A slight rotational movement of steering wheel 11 in either direction will move a notch 65 into alignment with lever 49 and spring 75 then forces or snaps the lever into the notch.

It will be understood that movement of the key from the Off position to the Lock position does not re-establish any circuits which are broken when the switch 111 is in the Off position. Further movement of the key K to an Accessory position does not affect the position of the lever assembly 49, 51 since lobe 103 is still in engagement with follower 99.

Thus, the steering shaft 7 and shift bowl 13 and tube 5 are locked against substantial rotation, and ignition switch 111 is disabled. Since all three mechanisms are located within housing 9, tampering is rendered extremely difficult.

The cylinder lock actuator 19 is of such construction that the key K can only be inserted therein and removed therefrom when the core 23 is in the Lock position. Also a plunger switch may be connected to the lock 19 and connected in a circuit with a door operated switch so that if the key K is located in the lock a buzzer will be energized when the door is opened, thereby providing a signal to the driver to remove the key.

The mechanism of this invention may be unlocked by rotating key K clockwise from the Lock position to the Off, Ignition or Start position. Such a key movement causes actuator plate 27 to move back to the position shown in FIG. 5, i.e., lobe 103 moves away from follower 99. Spring 85 then biases lever 51 back from its FIG. 7 position toward its FIG. 5 position to permit movement of the selector bowl 13 from Park position. Spring 85, due to the drive relationship between pin 97 and lever 51, biases lever 49 toward movement with the lever 51, thereby tending to move lever 49 back to its FIG. 5 position to unlock the steering shaft.

It may be possible in some circumstances that the friction between a side of lever 49 and a side of the notch 65 in which the lever is located is great enough to prevent spring 85 from forcing the lever 49 out of notch 65. However, the lever 49 does not remain in the notch 65, thus locking the steering shaft. Lobe 102 engages follower 100 as the plate 27 moves from the position shown in FIG. 7 to the positions shown sequentially in FIGS. 8, 5 and 3, and positively pushes lever 51 back to the FIG. 3 position. As the lever 51 moves it engages pin 97 and forces lever 49 back to its FIG. 3 position. Thus, the engine cannot be started until both the steering shaft and the transmission selector lever are in an unlocked condition.

Assembly of this apparatus may be easily accomplished. Assuming cover plate 59 is not attached, the lever assembly 49, 51, including shaft 47 and springs 75, 85 may be dropped into space 34 with the ends of shaft 47 dropping in slots 35 and 37. Due to the relationship of the parts, the assembly cannot be inserted upside down or backwards. Moreover, the interconnection between the levers 49 and 51 prevents locking of the steering shaft if either one of the levers is omitted when the mechanism is reassembled in the field after having been disassembled.

While the shift tube 5 shown herein is part of the controls for an automatic transmission, it will be understood that a similar and well-known tube and control mechanism for a manual transmission could be employed. In such case the notch 73 in the wall 71 would be formed in structure connected to tube 5 and aligned with the lever 51 only when the tube is in a predetermined selection position, such as Reverse for example.

In view of the foregoing, it will be seen that the several objects and other advantages are achieved.

Although only one embodiment of the invention has been disclosed and described, it is apparent that other embodiments and modifications of the invention are possible.

We claim:
1. In an automotive vehicle steering column structure including a support column connected to the vehicle, transmission selector means mounted on said column for rotation relative thereto, a steering control member rotatably mounted within said column, locking apparatus comprising a control housing means surrounding said steering control member, first locking means, said housing means including mounting means mounting said first locking means for movement in a plane which is generally parallel to the axis of said steering control member, said first locking means being movable generally toward and away from a plane passing through the axis of said steering control member, first keeper means connected to said steering control member for rotation therewith, second locking means, said mounting means mounting said second locking means for movement in a plane which is generally parallel to the axis of said steering control member, said second locking means being movable generally toward and away from said transmission selector means, said transmission selector means having second keeper means thereon rotatable therewith, said first and second locking means being movable between a locking position wherein they are respectively engageable with said first and second keeper means for locking said steering control member and said transmission selector means against substantial movement and a retracted non-locking position wherein said steering control member and said transmission selector means are not locked by said first and second locking means, and control means in said housing means for moving said first and second locking means, said control means being manually movable in one direction for urging said first and second locking means toward said locking position, said control means upon movement in an opposite direction providing a driving force for moving said locking means toward said retracted non-locking position.

2. Locking apparatus as set forth in claim 1 wherein said first locking means comprises a first lever, said second locking means comprising a second lever, said mounting means including shaft means mounting said levers for pivotal movement about the same axis, said first lever including a first arm extending upwardly from said shaft means to a point adjacent said first keeper means, said second lever including a first arm extending upwardly from said shaft means adjacent said first arm of said first lever and a second arm extending downwardly from said shaft means, a spring connected to said shaft means and having portions extending on opposite sides of said first and second levers tending to hold said levers together for substantially unitary pivotal movement in one direction.

3. In an automotive vehicle steering column structure including a support column connected to the vehicle, transmission selector means mounted on said column for rotation relative thereto, a steering control member rotatably mounted within said column, locking apparatus comprising a control housing means surrounding said steering control member, first locking means, said housing means including mounting means mounting said first locking means for movement generally toward and away from a plane passing through the axis of said steering control member, first keeper means connected to said steering control member for rotation therewith, second locking means, said mounting means mounting said second locking means for movement generally toward and away from said transmission selector means and said plane, said transmission selector means having second keeper means thereon rotatable therewith, said first and second locking means being movable between a locking position wherein they are respectively engageable with said first and second keeper means for locking said steering control member and said transmission selector means against substantial movement and a retracted non-locking position wherein said steering control member and said transmission selector means are not locked by said first and second locking means, and control means in said housing means for moving said first and second locking means, said control means being movable in one direction for urging said first and second locking means toward said locking position, said control means upon movement in an opposite direction providing a driving force for moving said locking means toward said retracted non-locking position, said control means including first and second cam means, said first cam means being rotatable and engageable with one of said locking means for urging said locking means toward locking position, said second cam means being rotatable towards engagement with said locking means and adapted, upon engagement with said locking means, to drive said locking means toward said retracted non-locking position.

4. In an automotive vehicle steering column structure including a support column connected to the vehicle, transmission selector means mounted on said column for rotation relative thereto, a steering control member rotatably mounted within said column, locking apparatus comprising a control housing means surrounding said steering control member, first locking means, said housing means including mounting means mounting said first locking means for movement generally toward and away from a plane passing through the axis of said steering control member, first keeper means connected to said steering control member for rotation therewith, second locking means, said mounting means mounting said second locking means for movement generally toward and away from said transmission selector means and said plane, said transmission selector means having second keeper means thereon rotatable therewith, said first and second locking means being movable between a locking position wherein they are respectively engageable with said first and second keeper means for locking said steering control member and said transmission selector means against substantial movement and a retracted non-locking position wherein said steering control member and said transmission selector means are not locked by said first and second locking means, and control means in said housing means for moving said first and second locking means, said control means being movable in one direction for urging said first and second locking means toward said locking position, said control means upon movement in an opposite direction providing a driving force for moving said locking means toward said retracted non-locking position, said locking means having first and second follower portions thereon, resilient means tending to hold said levers together for unitary movement in one direction, said control means including first cam means for engaging said one follower portion and applying a force against said locking means tending to move the latter into locking position, said locking means having means for driving one locking means in a direction toward its retracted position when the other locking means is moved toward retracted position, said control means including second cam means for engaging said second follower portion and driving said other locking means toward retracted position.

5. Locking apparatus as set forth in claim 4 wherein said control means includes a rotatable plate, said first and second cam means being located on said plate.

6. Locking apparatus as set forth in claim 4 including second resilient means biasing said levers toward retracted position.

7. Locking apparatus as set forth in claim 4 including a spring extending between one of said locking means and said housing biasing said one locking means toward retracted position.

8. Locking apparatus as set forth in claim 4 wherein said first locking means comprises a first lever, said second locking means comprising a second lever, said mounting means including shaft means mounting said levers for pivotal movement about the same axis, each of said levers having an upper and lower arm, said resilient means comprising a spring extending around said shaft means and engaging one arm of each of said levers, said first follower portion being located on one arm of said second lever, said second follower portion being located on the other arm of said second lever.

9. In an automotive vehicle steering column structure including a support column connected to the vehicle, transmission selector means mounted on said column for rotation relative thereto, a steering control member rotatably mounted within said column, locking apparatus comprising a control housing means surrounding said steering control member, a first lever, said housing means including mounting means mounting said first lever for pivotal movement generally toward and away from a plane passing through the axis of said steering control member, first keeper means connected to said steering control member for rotation therewith, a second lever, said mounting means mounting said second locking means for pivotal movement on the same axis as said first lever generally toward and away from said transmission selector means and said plane, said transmission selector means having second keeper means thereon rotatable therewith, said first and second levers being movable between a locking position wherein they are respectively engageable with said first and second keeper means for locking said steering control member and said transmission selector means against substantial movement and a retracted non-locking position wherein said steering control member and said transmission selector means are not locked by said first and second locking means, first resilient means extending between said levers tending to hold the latter together for unitary movement in one direction, second resilient means extending between one of said levers and said housing means, biasing said one lever toward retracted position, and rotatable control means in said housing means rotatable in one direction against one of said levers for urging said first and second levers toward said locking position.

10. Locking apparatus as set forth in claim 9 wherein said mounting means includes shaft means supporting said levers, each of said levers having an upper and lower arm, said first resilient means comprising a spring extending around said shaft means and engaging one arm of each of said levers, said second resilient means comprising a second spring extending around said shaft, said second spring having one leg engaging said one lever and another leg engaging said housing means.

11. Locking apparatus as set forth in claim 9 wherein said control means includes means engageable with one of said levers for moving said levers from a locking position toward a retracted position upon movement of said control means in a direction opposite to movement thereof in said one direction.

References Cited
UNITED STATES PATENTS

| | | | |
|---|---|---|---|
| 1,772,044 | 8/1930 | Hershey | 70—252 |
| 3,400,563 | 9/1968 | Lempke et al. | 70—184 |

MARVIN A. CHAMPION, Primary Examiner

R. L. WOLFE, Assistant Examiner

U.S. Cl. X.R.

70—248